(12) United States Patent
Smith et al.

(10) Patent No.: US 7,988,937 B1
(45) Date of Patent: Aug. 2, 2011

(54) DECONTAMINATION OF RADIOACTIVE METALS

(76) Inventors: W. Novis Smith, Philadelphia, PA (US); David S. Eaker, Lenoir City, TN (US); Rick Low, Lenoir City, TN (US)

(*) Notice: Subject to any disclaimer, the term of this patent is extended or adjusted under 35 U.S.C. 154(b) by 0 days.

(21) Appl. No.: 12/807,275

(22) Filed: Sep. 1, 2010

(51) Int. Cl.
*C01G 56/00* (2006.01)

(52) U.S. Cl. .......... 423/2; 423/6; 423/7; 423/11; 423/18

(58) Field of Classification Search .......... 423/2, 6, 423/7, 11, 18
See application file for complete search history.

(56) References Cited

U.S. PATENT DOCUMENTS

| | | | |
|---|---|---|---|
| 3,853,725 A * | 12/1974 | Skarbo | 205/590 |
| 3,891,741 A * | 6/1975 | Carlin et al. | 205/43 |
| 3,928,153 A * | 12/1975 | Gendron et al. | 205/596 |
| 4,162,296 A * | 7/1979 | Muller et al. | 423/139 |
| 4,196,076 A * | 4/1980 | Fujimoto et al. | 423/139 |
| 4,528,165 A * | 7/1985 | Friedman | 423/10 |
| 4,624,703 A * | 11/1986 | Vanderpool et al. | 205/593 |
| 4,718,996 A * | 1/1988 | Vanderpool et al. | 205/593 |
| 4,808,034 A * | 2/1989 | Birch | 405/195.1 |
| 5,156,722 A * | 10/1992 | Snyder et al. | 205/43 |
| 5,183,541 A * | 2/1993 | Snyder et al. | 205/560 |

FOREIGN PATENT DOCUMENTS

| | | | |
|---|---|---|---|
| GB | 1211816 | * | 11/1970 |
| JP | 62-297219 | * | 12/1987 |

* cited by examiner

*Primary Examiner* — Steven Bos
(74) *Attorney, Agent, or Firm* — John Lezdey

(57) ABSTRACT

The present invention relates to a method for the volumetric decontamination of radioactive metals. The method includes the step of precipitating out radioactive gamma and beta emitting nucleotides and then recovering non-radioactive metal compounds.

16 Claims, No Drawings

DECONTAMINATION OF RADIOACTIVE METALS

FIELD OF THE INVENTION

The present invention relates to the decontamination and conversion of volumetrically radioactive metals, especially nickel and its alloys. According to the invention the metals in the form of filings, powders, shots, flakes or the like are treated in an aqueous acid solution or additive environment. The resulting product is then either passed through a conditioned anionic exchange column to provide a decontaminated salt solution or neutralized to a pH of about 3-4 to precipitate out the radioactive nucleotides and then passing through the anion exchange column.

BACKGROUND OF THE INVENTION

High purity metals and alloys are used in the upgrading and processing of nuclear fuels and the containment of nuclear reactor fuel rods. These same metals and their alloys are used in the containment of the actual reactors both for power generation and for military vessels such as submarines. These same metals during the course of their service come under constant high radiation doses and accumulate low to moderate levels of radioactivity within the metals itself. This service acquired inherent radioactivity is termed "volumetric radioactivity" as opposed to surface radioactivity which is due to radioactive particles on the surface of the metal form or part. The surface radioactivity can be washed or scoured off while most of the volumetric radioactivity cannot be removed by physical processes such as washing or heating even up to the vary high melting point of the metal or metal alloy. Nickel and its alloys, for example, are widely used for these applications and accumulate various levels of volumetric radiation due to technetium 99, a beta radiation emitter and other radioactive isotopes. These radioactive isotopes include both gamma and beta emitters which are of concern along with the weaker alpha emitters. The removal of the volumetric radioactive isotopes from the volumetrically radioactive contaminated nickel and its alloys is of significant importance in order to recover this valuable metal. Since nickel is the preferred containment material for nuclear processing and reactors, volumetrically radioactive contaminated nickel will continue to be generated. The reuse of this contaminated nickel by re-melting it and restricting it only for nuclear use can be done but there is a quantity mismatch since there is a very large inventory of this volumetrically contaminated nickel already being stockpiled awaiting some means of purifying it back to background levels and for reuse in commercial applications. This nickel at its current volumetric radioactive levels cannot be recycled back into the normal commercial metal alloying and fabrication processes. This nickel and its alloys continues to be generated as older nuclear reactors and older nuclear fuel processing facilities are decommissioned. Not only is the economic loss and value of major concern, the necessity to recycle and reuse the limited amount of metals such as nickel is a worldwide concern in order to maintain the long term availability of such important metals.

Various decontamination processes are known in the art, and specifically for decontamination of nickel. Nickel can be removed by selectively stripping from an acidic solution by electrowinning. See U.S. Pat. No. 3,853,725. Nickel may also be removed by liquid, liquid extraction or solvent extraction. See U.S. Pat. Nos. 4,162,296 and 4,196,076. Further, various phosphate type compounds have been used in the removal of nickel. See U.S. Pat. Nos. 4,162,296; 4,624,703; 4,718,996; 4,528,165 and 4,808,034.

It is known that metallic nickel, contaminated with fission products, could be decontaminated to remove any actinides present by direct electro-refining based on the differences in reduction potential in the electromotive force (emf) series. Actinide removal is favored by two phenomena during electro-refining. Actinides have a significantly higher reduction potential relative to nickel and they are normally won from molten salt electrolyte rather than from aqueous electrolyte. See U.S. Pat. Nos. 3,928,153 and 3,891,741, for example.

In spite of these disclosures, there remains a need for an economical and efficient method to decontaminate metals.

SUMMARY OF THE INVENTION

According to the present invention there is provided a method for the decontamination of radioactive metals. The method comprises the steps of:
  A) dissolving the radioactive metals in an aqueous acid solution which provides an oxidative atmosphere in the presence of about 0.1 to 1% of iron particles;
  B) neutralizing the solution from step A) to a pH of about 3 to 4 to form a gelatinous precipitate which contains radioactive gamma emitting nucleotides and beta emitting nucleotides and iron hydroxide;
  C) filtering the product of step B) and optionally passing the filtrate through a strong anion exchange column which has been conditioned with a solution having a pH of about 3-4;
  D) neutralizing the filtrate from step C) to a pH of about 10-12 to form a hydroxide or other salt and then recovering the metal hydroxide or metal salt from the filtrate of step C).

Advantageously, the anion exchange column comprises a sulfate anion resin.

It is an object of the invention to decontaminate radioactive metals.

It is another object of the invention to decontaminate radioactive nickel and form nickel hydroxide.

It is a further object of the invention to maintain any technetium present in the pertechnate anion state for absorption on an anion exchange column.

DESCRIPTION OF THE PREFERRED EMBODIMENTS

The present invention relates to a method for the decontamination of radioactive metals and to form metal compounds which, if desired, can be converted to non-radioactive metals.

According to the method the radioactive metal in the form of filings, powder, shot or the like is subject to the following steps:

A. Dissolve the radioactive metals in an aqueous acid solution which provides an oxidative environment in the presence of about 0.1 to 1% by weight of iron particles. In some cases nickel metal already has the iron present.

B. Neutralizing the solution from step A) with a base to a pH of about 3 to 4 to form a gelatinous precipitate which contains radioactive gamma emitting nucleotides and beta emitting nucleotides and an iron compound. Potassium hydroxide and sodium hydroxide are the preferred bases.

C. Filtering the product of step B) or optionally passing the filtrate through a strong anionic exchange column which has been conditioned with a solution having a pH of about 4 with a sulfate or nitrate solution.

The anionic exchange resin is preferably SIR-110-HP of ResinTech of New Jersey which initially is a chloride anionic resin. Other strong anionic exchange resins can be used such as DOW 550A from Dow Chemical Company. The anionic exchange column is preferably conditioned prior to use with a concentrated solution of sodium sulfate or sodium nitrate at a pH of about 3 to 4. (The metal sulfate or nitrate salt can be recovered at this point by concentration of the filtrate or optionally);

D. Neutralizing the filtrate to a pH of about 10-12 to form a hydroxide compound. Preferably a base such as sodium or potassium hydroxide is utilized.

Preferably, the radioactive metal is dissolved in an acid solution of about 0.5 to 2.5M. In the case of nickel, the upper concentration is determined and limited by the solubility of the nickel salt. The temperature can be maintained from about 20° C. to 100° C. depending on the rate of addition and the rate of reaction desired.

There is a need to maintain an oxidative environment to ensure that the technetium is maintained in the oxidized state or in the pertechnate anion state for absorption on the anionic exchange column if used for removal. The presence of nitric acid maintains this oxidative environment even up to pH 4 for column absorption. Since hydrochloric acid and acetic acid provide a reducing environment in the strong acid, these will not ensure that the technetium cation or anion is maintained or even converted to the desired pertechnate anion for removal. However, the other acids such a hydrochloric acid, acetic acid, formic acid, citric acid, and lower molecular weight carboxylic acid having up to six carbon atoms can be used with other metals such as lead which do not have isotopes of technetium. It is important that about 0.1 to 1% of iron particles are added to the initial slurry of dissolving metals to provide a small amount of soluble iron salts, preferably the nitrate or sulfate. If the nickel or other metals contain a small amount of iron, additional iron is not required.

After the metals have been dissolved in the acid solution, the solution is neutralized with a hydroxide base to a pH of about 3 to 4 to form a gelatinous precipitate of ferric iron and any aluminum hydroxide. This gelatinous precipitate occludes, absorbs, and drags down substantially all of the radioactive gamma and beta emitting nucleotides including technetium 99. The resulting slurry of gelatinous precipitate is filtered to produce a solution of the metal salts or compounds. The small amount of gelatinous precipitate has a high level of radioactivity and must be handled with appropriate procedures depending on the level of radioactivity of the starting metal. The gelatinous material can be readily disposed of or used to recover any isotopes.

The filtrate can be either concentrated to recover the metal salts or passed through a conditioned ion exchange column to further remove technetium 99. The ion exchange column can be any anion from hydroxide to a chloride. A hydroxide column is basic and needs to be changed to the sulfate to nitrate anion at a pH of about 3 to 4 so as not to precipitate nickel hydroxide on the column which starts to precipitate at a pH of about 4.5. The chloride anion must be removed since it acts as a reducing forming chlorine in presence of oxidized forms of metal cations such as the pertechnate. The chloride anion would destroy this necessary oxidized anion which is readily absorbed on the ion exchange column at the pH 3-4.5 conditions. Therefore the column must be preconditioned with a concentrated sodium of pH 3-4 sodium sulfate or nitrate. After the filtrate of sodium salt has been processed down through the anion exchange column, the solution is essentially free of technetium 99. However the top of the anion exchange column shows presence of the technetium 99.

The filtrate from the ion exchange column can be concentrated to recover the metal salts or be treated with a alkali hydroxide to form hydroxide compounds, especially to form nickel hydroxide which can be used in batteries.

The metal forms can be obtained by electrowinning as described in U.S. Pat. No. 5,156,722, which is herein incorporated by reference or electro-refining the decontaminated metal compounds described in U.S. Pat. No. 5,183,541 which is incorporated herein by reference.

Example 1

An anion exchange column which was 9" long and 1 inch in diameter was filled with 65 g of Dow 550A which is an anion exchange resin. The resin was conditioned by passing a concentrated solution of sodium sulfate at a pH of 4, three times through the column at room temperature.

Separately, 100 g of radioactive nickel filings and 1 g of iron filings were slurred in 500 ml of water. A mixture of sulfuric acid and nitric acid was slowly added to the slurry with stirring until all of the metal was dissolved.

The resultant solution was neutralized to a pH of about 4.5 with sodium hydroxide solution to form a gelatinous precipitate which contained the radioactive nucleotides. This solution was then filtered. The filtrate was passed through a sulfate preconditioned (pH 4) anion exchange column (SIR-110-48 of ResinTech, NS).

The filtrate was then neutralized to pH 10-11 to precipitate out nickel hydroxide. This slurry was filtered and the nickel hydroxide recovered and dried. There was no detectable gamma or beta radiation.

Alternatively, sodium carbonate can be used to precipitate nickel carbonate.

The gamma and beta emissions were measured in disintegrations per minute (dpm).

Results

TABLE I

Beta and Gamma Levels Achieved

| | Beta Levels | (pCi/g) | Gamma (minus Ci/ml) |
|---|---|---|---|
| 1. Starting Nickel metal filings | Tc 99 | 60 | $3 \times 10^{-4}$ |
| 2. Ni $(NO_3)_2$ isolated from filtrate from iron hydroxide precipitation (pH 4.5) | — | — | $1 \times 10^{-6}$ (background) |
| 3. Iron Hydroxide Gel | — | — | $1.5 \times 10^{-5}$ (higher for small material) |
| 4. Product Ni $(OH)_2$ | 1.9 | 1.9 | background level |
| 5. White salt from neutralized process filtrate after Nickel hydroxide removal | non detectable | 7.1 | background level |
| 6. Top of ion exchange column | 54 | 10 | — |
| 7. Bottom of ion exchange column | 2.9 | 4.7 | — |

*General acceptable level for Beta Is less than 26 pCi/g - Process accomplished this.
Note:
Alpha was non detectable in Ni $(OH)_2$
The readings were based on a Geiger counter.

Example 2

To a reaction beaker containing 100 g of nickel filings having a radioactivity of the gamma nucleotides of 3 micro curies/ml and of the beta nucleotide 0.04 micro curies/ml was added 70% nitric acid which was made up with 800 ml of water in three portions. After 8 minutes from the addition of the first portion, the exothermic reaction started. After another 15 minutes, the second portion was added. The third portion was added after another 15 minutes. The reaction was maintained at a temperature of 60-70° C. After about 4 hours, the solution was neutralized to a pH of 4.5 and left overnight to cool. A gelatinous precipitate formed which was filtered off and had a gamma nucleotide count of 1.46 micro curies and a beta nucleotide count of 0.05 micro curies. The solution which contained a nickel compound had no detectable gamma count. The solution was added to a beaker and 40% sodium hydroxide was added and the solution was brought up to a pH of 11.5 in which nickel hydroxide precipitated out. The precipitate was dried and tested. The beta and gamma were at background levels. There was no beta or gamma emissions in either the filter cake. The filtrate containing sodium nitrate was neutralized and showed background for beta emissions.

It is to be understood that the above-described arrangements are only illustrative of the application of the principles of the present invention. Numerous modifications and alternative arrangements may be devised by those skilled in the art without departing from the spirit and scope of the present invention and the appended claims are intended to cover such modifications and arrangements. Thus, while the present invention has been fully described above with particularity and detail in connection with what is presently deemed to be the most practical and useful embodiments of the invention, it sill be apparent to those of ordinary skill in the art that numerous modifications, including, but not limited to, variations in materials, form, function and manner of operation and use may be made, without departing from the principles and concepts of the invention as set forth in the claims.

What is claimed is:

1. A method for the decontamination of radioactive metals which comprises the steps of:
    A) dissolving said radioactive metals in an aqueous acid solution which provides an oxidative environment in the presence of about 0.1 to 1% by weight of iron particles;
    B) neutralizing the solution from step A) to a pH of about 3 to 4 to form a gelatinous precipitate which contains radioactive gamma emitting nucleotides and beta emitting nucleotides and an iron compound;
    C) filtering the product of step B) and passing the filtrate through a strong anion exchange column;
    D) neutralizing the filtrate from step C) to a pH of about 10-12, optionally concentrating the filtrate from step C); and then
    E) recovering any metal compounds from step D).

2. The method of claim 1 wherein the radioactive metal is selected from the group consisting of nickel, lead, cadmium, zinc, copper, manganese and silver.

3. The method of claim 2 wherein the radioactive metal is nickel.

4. The method of claim 1 wherein the anion exchange column is conditioned with a member selected from sodium nitrate or sodium sulfate solution at a pH of about 3-4.

5. The method of claim 1 wherein the acid solution of step A) comprises nitric acid and sulfuric acid.

6. The method of claim 1 wherein the filtrate from step C) is passed through a strong anionic exchange column which has been conditioned with a solution having a pH of about 3-4 and then proceeding to step D).

7. The method of claim 1 wherein the acid solution of step A) comprises an acid selected from the group consisting hydrochloric acid, acetic acid, formic acid, citric acid and lower molecular weight carboxylic acid having up to six carbon atoms.

8. The method of claim 1 wherein the radioactive metal is nickel and sodium hydroxide solution is added in step D) to precipitate out nickel hydroxide.

9. The method of claim 1 wherein the radioactive metal is nickel and nitric acid is used to dissolve the nickel metal in step A).

10. The method of claim 1 wherein the anionic exchange column comprises a chloride anionic resin.

11. The method of claim 1 wherein the metal compound of step E) is converted to a metal state.

12. A method for the decontamination of radioactive nickel which comprises the steps of;
    a) dissolving said radioactive nickel in an aqueous acid solution selected from the group consisting of sulfuric acid and nitric acid in the presence of about 0.1 to 1% by weight of iron particles;
    b) neutralizing the solution from step a) with a base to a pH of about 3 to 4 to form a gelatinous precipitate containing gamma and beta emitting nucleotides and an iron compound;
    c) filtering the product of step b) and passing the filtrate through a strong anionic exchange column which has been conditioned to a pH of about 4 with a solution of sodium sulfate or sodium nitrate;
    d) optionally concentrating the filtrate of step c) to obtain nickel sulfate or nickel nitrate, or neutralizing the filtrate of step c) with a base to obtain a nickel compound precipitate, and then
    e) recovering the nickel compound.

13. The method of claim 12 wherein step d) comprises neutralizing the filtrate from step c) to a pH of about 10 to 12 to obtain a nickel compound.

14. The method of claim 13 wherein the nickel compound is nickel hydroxide.

15. The method of claim 13 wherein the filtrate is neutralized with an alkali compound selected from the group consisting of hydroxide, carbonate, sulfide, stearate, oleate and oxalate.

16. The method of claim 12 wherein technetium 99 is removed.

* * * * *